United States Patent [19]
Reintjes et al.

[11] Patent Number: 4,868,515
[45] Date of Patent: Sep. 19, 1989

[54] NARROW-BANDWIDTH UNSTABLE LASER RESONATOR

[75] Inventors: John F. Reintjes, Alexandria, Va.; David G. Cooper, Riva, Md.

[73] Assignee: The United States of America as represented by the Secretary of the Navy, Washington, D.C.

[21] Appl. No.: 260,847

[22] Filed: Oct. 21, 1988

[51] Int. Cl.$^4$ ............................................. H01S 3/08
[52] U.S. Cl. ..................................... 330/4.3; 372/95
[58] Field of Search .................... 330/4.3; 372/20, 92, 372/95, 98

[56] References Cited

U.S. PATENT DOCUMENTS

| | | | |
|---|---|---|---|
| 3,622,907 | 11/1971 | Tomlinson | 330/4.3 |
| 3,942,127 | 3/1976 | Fluhr et al. | 330/4.3 |
| 4,216,434 | 8/1980 | Pond et al. | 372/95 X |
| 4,267,524 | 5/1981 | Paxton et al. | 372/95 |
| 4,494,235 | 1/1985 | Guch, Jr. et al. | 372/95 X |
| 4,514,850 | 4/1985 | Holmes et al. | 372/95 |
| 4,766,393 | 8/1988 | Johnson | 372/95 X |
| 4,803,696 | 2/1989 | Pepper et al. | 372/92 X |

FOREIGN PATENT DOCUMENTS 0017974 1/1985 Japan .................................. 372/95

*Primary Examiner*—Thomas H. Tarcza
*Assistant Examiner*—Mark Hellner
*Attorney, Agent, or Firm*—Thomas E. McDonnell; George Jameson

[57] ABSTRACT

A narrow-bandwidth, unstable laser resonator comprising: an output section including a laser gain medium for generating and amplifying light, a first reflective element for reflecting and collimating light from the gain medium back through the gain medium, and a second reflective element having a hole therein, the second reflective element being responsive to the collimated light passed through the gain medium for reflecting most of the collimated light out of the unstable laser resonator as an output beam and for passing the remaining portion of the collimated light through the hole therein as a residual beam; and a feedback ring including an optical path, a beam splitter for passing a first portion of the residual beam into the optical path in a first direction, a frequency-narrowing element disposed at a position in the optical path where the first portion of the residual beam is collimated, the frequency-narrowing element being operative to narrow the frequency bandwidth of the first portion of the residual beam to produce a narrow-bandwidth collimated beam, a lens disposed in the optical path for focusing the narrow-bandwidth collimated beam to cause light from that beam to be reflected from the beam splitter and passed through the hole in the second reflective element as a narrow-bandwidth convergent beam before the narrow-bandwidth convergent beam before the narrow-bandwidth convergent beam is amplified by the gain medium.

14 Claims, 10 Drawing Sheets

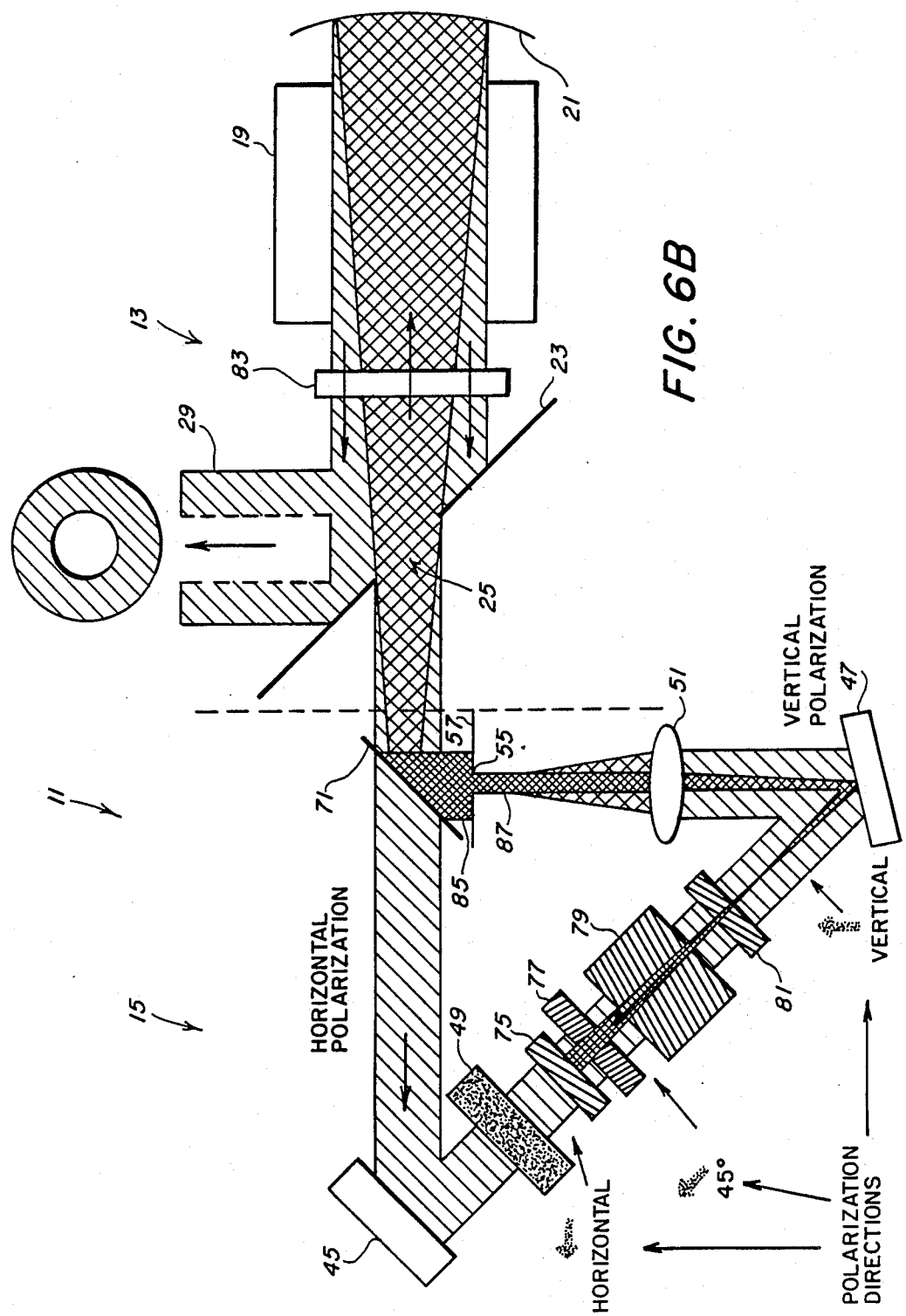

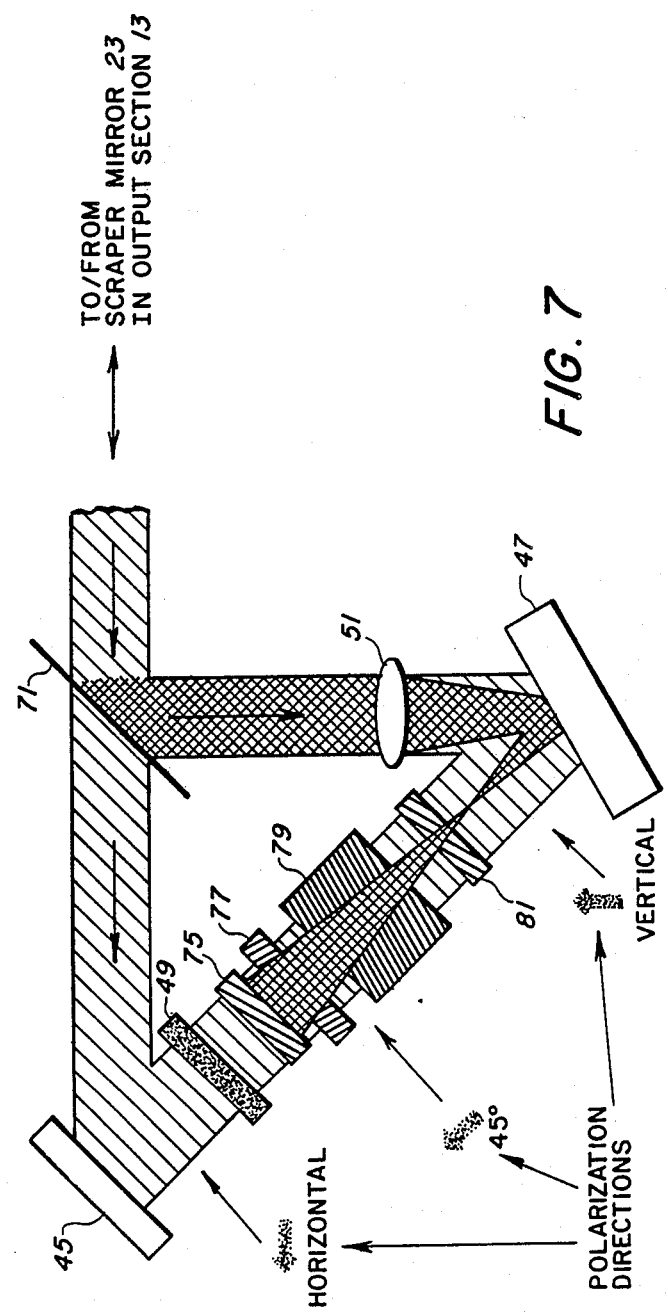

NARROW-BANDWIDTH UNSTABLE LASER RESONATOR

BACKGROUND OF THE INVENTION

The present invention relates to unstable laser resonators and particularly to an unstable laser resonator which produces optical radiation that simultaneously has the high output power and diffraction-limited divergence that are characteristic of an unstable laser resonator and also the narrow bandwidth that can usually be obtained only with a stable laser resonator.

Many applications of lasers require that they produce radiation that simultaneously possesses the characteristics of high power, diffraction-limited divergence and narrow-bandwidth. In addition, a symmetric output profile is desirable in many situations for purposes of optimal propagation or focusing. Various techniques have been developed for producing laser radiation with each of these characteristics. However, in many situations the requirements for producing one of these characteristics conflicts with those for producing the others, with the result that systems that simultaneously possess all three characteristics are usually expensive and complicated, often consisting of multiple lasers. The following techniques are currently available for producing laser radiation with two of these characteristics.

A stable laser resonator can be used to produce laser radiation that has low spatial divergence and narrow-bandwidth. The low spatial divergence is obtained by restricting the laser to operate in the lowest transverse mode of the stable laser resonator cavity. For wavelengths in the near infrared, or shorter, this usually requires cavity apertures with diameters on the order of one millimeter (1 mm) or less. As a result, the power available from a stable laser resonator is limited, often to values that are orders of magnitude less than could be obtained if larger apertures (which are available) were used. The bandwidth of a stable laser resonator is usually restricted by using a dispersing element in the resonator or cavity, (e.g. a grating, prism, Fabry-Perot etalon, or some combination of these) to spread the radiation in angle according to wavelength. Narrow-bandwidth operation is then obtained by restricting the angular acceptance of the cavity. This operation is compatible with the mode-restricting aperture used for limiting the spatial divergence that was described above, but is again incompatible with high power operation.

High power can be obtained with narrow-bandwidth, low divergence laser radiation by the use of laser amplifiers following the stable laser resonator. Such a resultant system is currently the only known prior art method for obtaining laser radiation with all three of these characteristics. While being capable of producing radiation with the desired characteristics, the multiple lasers that are required increase the size and cost of the system and the complexity of the optical train required to match the laser beam into each of the laser amplifier stages. In many cases the reliability of pulsed systems can be degraded because of jitter in timing between the various laser amplifier stages.

An unstable laser resonator or cavity is an alternative approach to obtaining high power, low divergence laser radiation. In an unstable laser resonator the laser radiation can be made to fill a relatively large diameter cavity to allow operation at high power levels, while the dynamics of the unstable resonator restrict the divergence of the output laser radiation to a low value, usually near the diffraction limit for a suitably designed system. However, such a prior art unstable laser resonator has a broad-bandwidth.

Some success has been achieved in the frequency narrowing of the laser radiation from an unstable laser resonator cavity by using a diffraction grating. This technique has worked best with lasers that have sharp line structure, such as molecular lasers. For example, selection of a single line in a hydrogen-fluoride laser has been reported in several configurations involving the insertion of a diffraction grating into a standard unstable laser resonator cavity. However, with other types of lasers that have a broad band continuous gain distribution, such as excimer lasers or dye lasers, the simple insertion of a diffraction grating in a standard unstable laser resonator configuration does not provide sufficient spectral discrimination for narrow band operation. This result is due to the fact that the standard unstable laser resonator cavity is fundamentally incompatible with the needs of frequency narrowing elements used to restrict the bandwidth, especially when extremely narrow linewidths are desired. The nature of the modes in an unstable laser resonator requires that the divergence of the laser radiation inside the cavity alternate between low and high values on alternate passes through the cavity. As a result, it becomes impossible to use angular discrimination to restrict the bandwidth of the laser radiation as was done in stable laser resonator cavities. Thus, although currently available unstable laser resonators have the configuration of choice for producing high power, low divergence radiation from laser cavities, they are not compatible with a simultaneous requirement of narrow-bandwidth.

OBJECTS OF THE INVENTION

Accordingly, it is an object of the invention to provide a novel type of narrow-bandwidth, unstable laser resonator.

Another object of the invention is to provide an unstable laser resonator configuration which produces laser radiation that simultaneously possesses the characteristics of high power, diffraction-limited divergence and narrow-bandwidth.

A further object of the invention is to provide an unstable laser resonator, which includes an asymmetric ring for frequency narrowing the laser radiation in the resonator cavity, in order to produce laser radiation that simultaneously possesses the characteristics of high power, diffraction-limited divergence and narrow-bandwidth.

SUMMARY OF THE INVENTION

These and other objects of the invention are achieved by providing a narrow-bandwidth, unstable resonator which comprises: an output section including a laser gain medium for generating and amplifying light, an output coupler, an output mirror for reflecting and collimating light from the gain medium back through the gain medium to the output coupler, the output coupler passing a first portion of the collimated light out of the unstable resonator as an output beam which simultaneously possesses the characteristics of high power, diffraction-limited divergence and narrow bandwidth; and a feedback section including an optical path, a coupling device for passing a second portion of the collimated light from the output coupler into the optical path in a first direction, a frequency narrowing element disposed in the optical path for narrowing the frequency bandwidth of the second portion of the collimated light to produce a desired a narrow-bandwidth beam, a lens to convert the narrow bandwidth collimated beam to a narrow bandwidth divergent beam, a portion of the desired narrow-bandwidth divergent beam being passed by the coupling device through the output coupler for amplification by the gain medium before being transmitted to the output mirror.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views, and wherein:

FIGS. 6A and 6B illustrate different operations in a schematic diagram of a sixth embodiment of the invention;

FIG. 7 is a schematic diagram of a seventh embodiment of the invention;

DETAILED DESCRIPTION OF THE INVENTION

The basic principal of the invention involves the use of a feedback ring in the cavity of an unstable laser resonator to provide laser radiation that simultaneously has the power output and diffraction-limited divergence that are characteristic of an unstable laser resonator and also the narrow-bandwidth that can usually be obtained only with a stable laser resonator. This basic principal is illustrated in FIG. 1, which will now be discussed.

Figure 1:
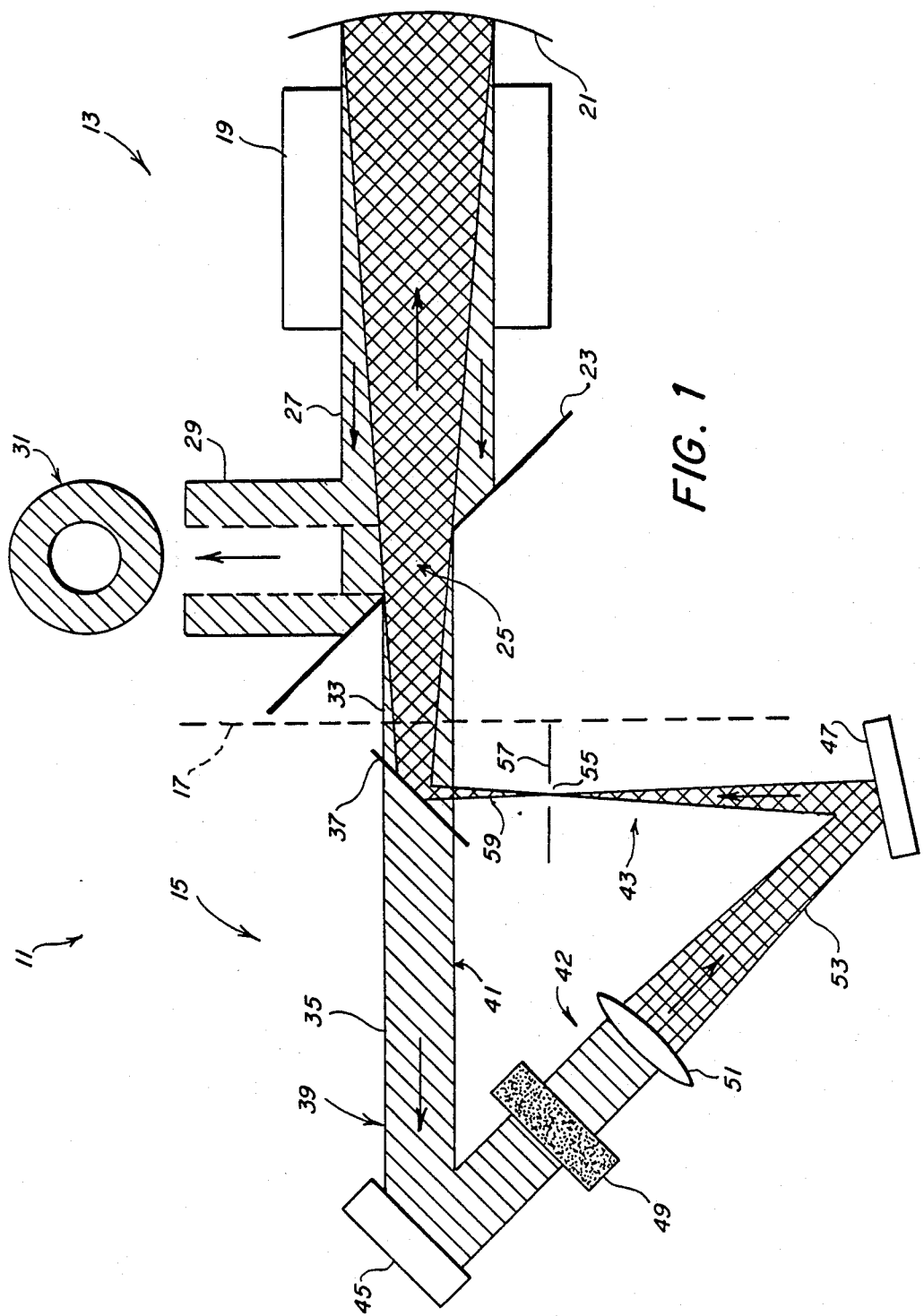
FIG. 1 is a schematic diagram of a narrow-bandwidth unstable resonator using a feedback ring, according to a first embodiment of the invention.

FIG. 1 is a schematic diagram of a first embodiment of the invention. The embodiment of FIG. 1 illustrates a narrow-bandwidth unstable laser resonator or cavity 11 which includes an output section 13 and a feedback ring or feedback section 15 which are shown separated from each other by a dashed line 17. The output section 13 contains a laser amplifier module or gain medium 19, an output mirror 21 and an output coupler or scraper mirror 23 which typically has a hole 25 in its center. All of these elements 19, 21 and 23 are also contained in a conventional unstable laser resonator (not shown). The feedback section 15 of the unstable laser resonator 11 includes a coupling device or beam splitter, a frequency narrowing element and a lens which in combination with the output section 13 produces the advantages of the invention.

The invention of FIG. 1, and its operation, can best be understood by tracing the path of light as it makes a round trip in the cavity of the unstable laser resonator 11.

Light that is generated and/or amplified in the gain medium 19 is transmitted to the output mirror 21. The configuration of the output mirror 21 is such that the light incident thereon is reflected back through the gain medium 19 as a collimated light beam 27. Most of this collimated beam 27 is deflected out of the cavity of the resonator 11 by the output coupler or scraper mirror 23 to form an output beam 29. Because there is no relection from the area of the hole 25, the output beam 29 is donut-shaped, as shown by the end view 31 of the output beam 29. Part of the collimated beam 27, the part in the central Fresnel core of the cavity of the output section 13, passes through the hole 25 in the scraper mirror 23 and into the feedback ring 15. This part of the collimated beam 27 is designated as collimated beam 33.

Half of the collimated beam 33, designated as collimated beam 35, passes through a coupling device or beam splitter 37 into an optical path 39 in the feedback ring 15, traveling in a counterclockwise direction. The feedback ring is comprised of three legs 41, 42 and 43. A first corner element or corner mirror 45 is located at the intersection of legs 41 and 42, while a second corner element or corner mirror 47 is located at the intersection of legs 42 and 43. The beam splitter 37 is the third corner element and is located at the intersection of legs 43 and 41.

It should be noted at this time that, although a feedback ring 15 with the three legs 41, 42 and 43 is illustrated in the embodiment of FIG. 1, as well as in each of the other embodiments in the remaining Figures, the feedback ring 15 could be comprised of four or more legs within the purview of the invention.

After collimated beam 35 passes through the beam splitter 37, it is reflected by corner mirror 47 into a leg 42 of the feedback ring 15. Disposed in leg 42 is a frequency narrowing element 49, which can represent one or more serially-aligned frequency narrowing optical devices, such as diffraction gratings, prisms or Fabry-Perot etalons, or a combination thereof. The frequency bandwidth of the collimated beam 35 is narrowed from the broad-band of the gain medium 19 to a desired narrow-bandwidth as the collimated beam 35 passes through the frequency narrowing element 49 in leg 42.

The narrow-bandwidth collimated beam 35 from the element 49 is focused by a positive lens 51 to produce a converging beam 53 which reflects off of corner mirror 47 and focuses at an aperture 55 in a plate 57. At the aperture 55, the beam 53 changes to a diverging beam 59. This diverging beam 59 reflects from the beam splitter 37 into the output section 13, passes back through the hole 25 in the scraper mirror 23, reflects from the output mirror, becoming collimated in the process, and then makes another pass through the cavity of the unstable laser resonator 11 as described before.

Thus, basically the positive lens 51 is selected so that the divergence of the beam 59, after it (the predecessor beam 53) is focused on the aperture 55, matches the divergence required by the output section 13 for collimation of the beam 59 at the output mirror 21.

It should be recalled that half of the collimated beam 33, designated as collimated beam 35, was passed through the beam splitter 37 into the optical path 39, traveling in a counter clockwise direction. The remaining portion of that collimated beam 33 is reflected from the beam splitter 37 to the backside of the plate 57 in leg 43 as an unwanted clockwise-propagating beam (not shown). The aperture 55 in the plate 57 serves to suppress or limit this unwanted clockwise-propagating beam. The diameter of the aperture 55 should be small enough to block a major portion of the unwanted clockwise-propagating beam such that the clockwise-propagating beam is confined to the Fresnel core in the output section 13. In this way only the forward or counterclockwise rotating beam 59 from the feedback ring 15 will be contained in the output beam 29. On each pass through the cavity of the unstable laser resonator 11, the beam splitter 37 couples some of the light that was clockwise-propagating in the feedback ring 15 on the previous pass into the counterclockwise propagating beam so that it can be coupled out of the resonator 11 as part of the output beam 29.

It should be mentioned at this time that the frequency narrowing element 49 could be positioned in any of the legs 41, 42 and 43 of the feedback ring 15, as long as it is positioned in the ring 15 to receive only the collimated beam 35. This is due to the fact that the best frequency narrowing performance of the element 49 is obtained when the beam is collimated both entering and leaving the frequency narrowing element 49. Thus, in FIG. 1 the element 49 could be located along leg 41.

Figure 2:
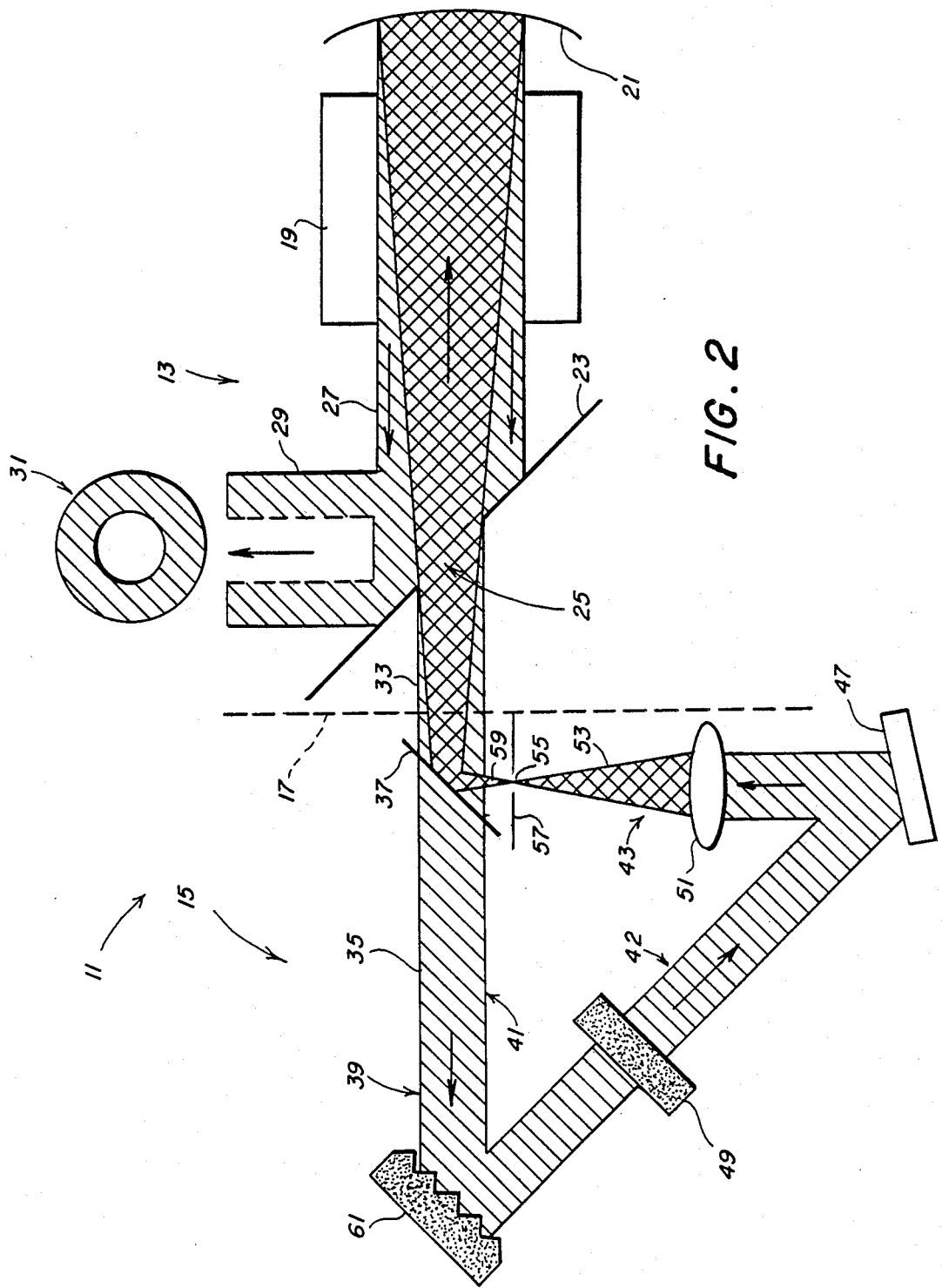
FIG. 2 is a schematic diagram of a second embodiment of the invention.

FIG. 2 illustrates a second embodiment of the invention and is a modification of the embodiment of FIG. 1. In FIG. 2, a diffraction grating 61 is substituted for the corner mirror 45 of FIG. 1 at the intersection of the legs 41 and 42 in order to provide additional frequency narrowing of the collimated beam 35. Thus, the diffraction grating 61 adds to the frequency selecting ability of the Fabry-Perot etalon or frequency narrowing element 49, with the grating 61 providing a coarse frequency narrowing and the etalon 49 providing a fine frequency narrowing of the frequency bandwidth of the collimated beam 35. In this embodiment, the aperture 55 should be a diffraction limiting pinhole to improve the frequency selection of the diffraction grating 61 and the spatial quality of the output beam 29, and to also aid in the suppression of the unwanted clockwise-propagating beam in the feedback ring 15. Also, shown in FIG. 2, is the asymmetric placement of the focusing lens 51 in leg 43 of the feedback ring 15. As a result, the collimated beam 35 is not focused by the lens 51 until after the beam 35 is reflected from corner mirror 47. This provides a shorter focal length for the lens 51 and more diversity in the placement of the etalon 49, since the etalon 49 can now be positioned in the collimated portion of the beam 35 in any of the legs 41, 42 and 43.

Figure 3:
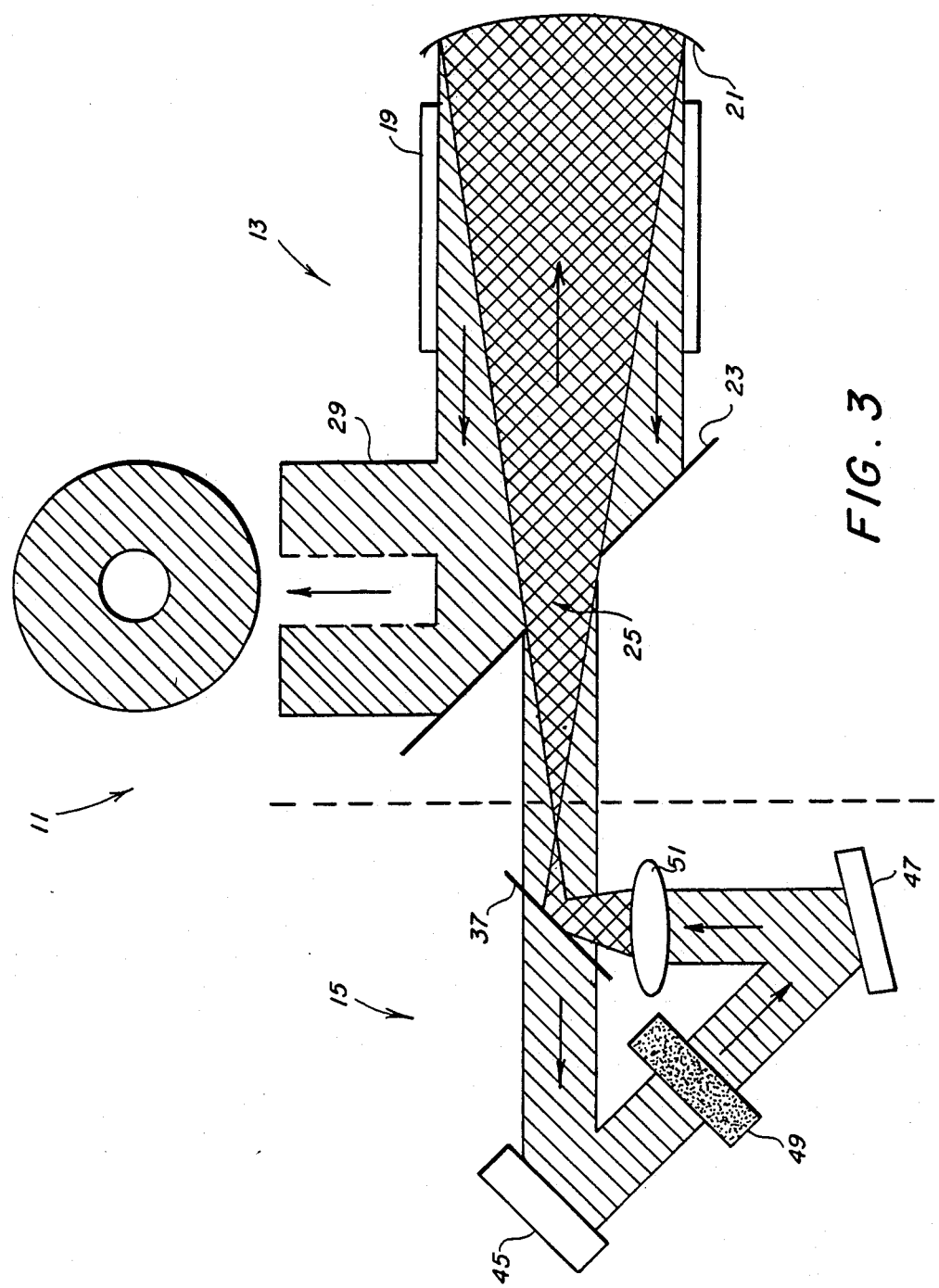
FIG. 3 is a schematic diagram of a third embodiment of the invention.

FIG. 3 illustrates a third embodiment of the invention and is a second modification of the embodiment of FIG. 1. In FIG. 3, the aperture 55 and plate 57 of FIG. 1 are omitted, and the lens 51 of FIG. 1 is repositioned to leg 43. As a result, the focus of the lens 51 is outside of the feedback ring 15. All other components of FIG. 3 are identical in structure and operation to the corresponding components shown in FIG. 1.

The configuration of the embodiment of FIG. 3 is useful in shortening the length of the feedback ring 15, which can be important in the operation of lasers whose gain has a limited temporal duration. With a shortened length of the feedback ring 15, an advantage is gained in terms of minimizing the round trip distance in the cavity of the unstable laser resonator 11.

Figure 4:
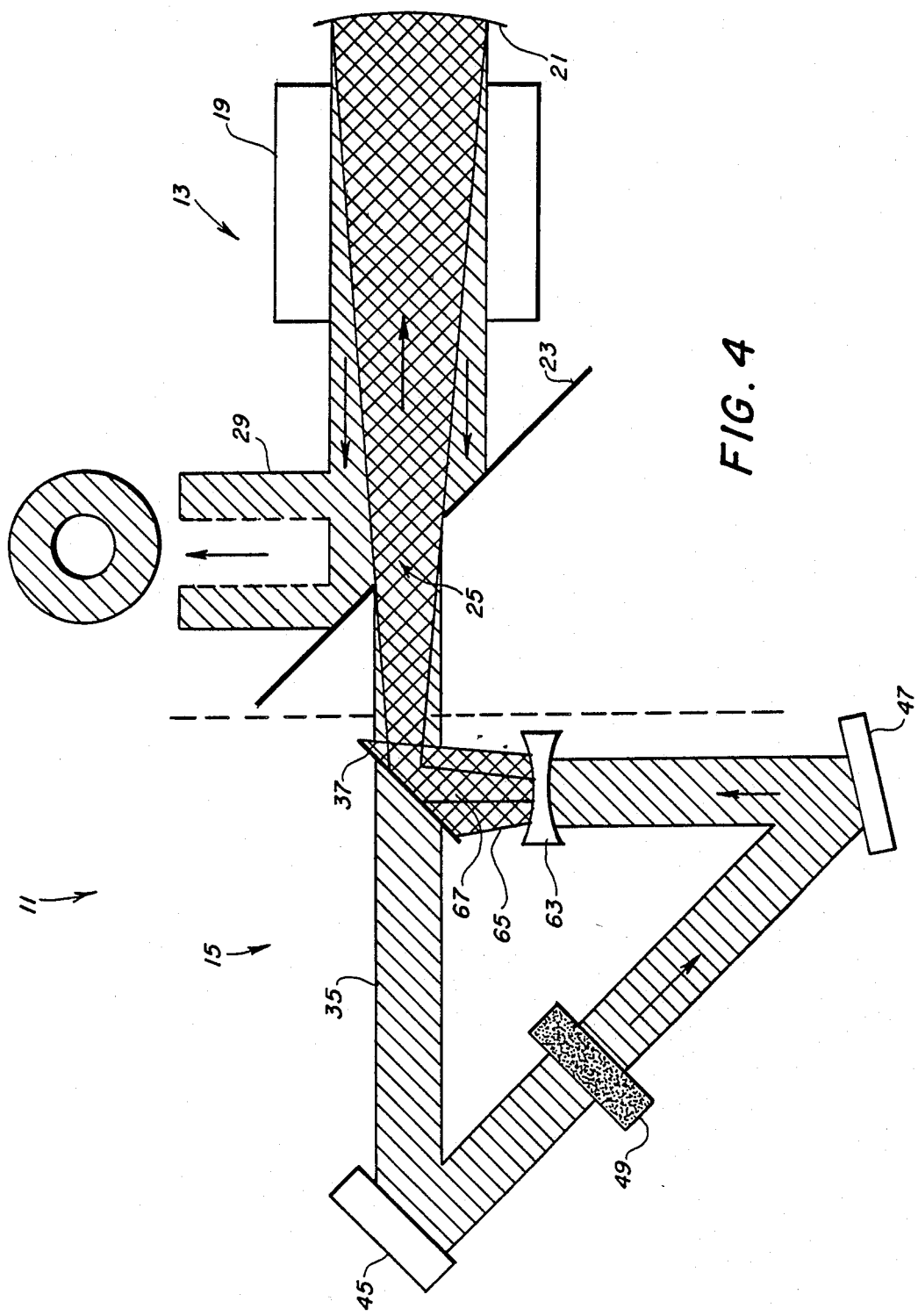
FIG. 4 is a schematic diagram of a fourth embodiment of the invention.

FIG. 4 illustrates a fourth embodiment of the invention and is a modification of the embodiment of FIG. 3. In the embodiment of FIG. 4, the positive lens 51 of FIG. 3 is replaced with a negative lens 63. All other components of FIG. 4 are identical in structure and operation to the corresponding components shown in FIG. 3.

In the operation of the embodiment of FIG. 4, after the collimated beam 35 passes through the etalon 49 and is reflected by the corner mirror 47, the negative lens 63 operates to diverge the beam 35. The resultant diverging beam 65 reflects from the beam splitter 37. However, only a central portion 67 of the diverging beam 65 will reflect from the beam splitter 37 and pass through the hole 25 in the scraper mirror 23. The advantage in developing the diverging beam 65 is that the diverging beam 65 allows the use of a shorter path in the feedback ring 15, if it is necessary because of limitations in the gain medium 19.

The use of the negative lens 63 in the feedback ring 15 makes the resonator 11 into a positive branch unstable resonator. As such, the positive branch unstable resonator of FIG. 4 avoids the high intensities that are present in the focus of the positive lens 51 in the negative branch resonator illustrated in each of the other Figures in this application. This embodiment of FIG. 4 can prove useful in operation with lasers that have a power high enough that breakdown can occur at the focus of, for example, the positive lens 51 of FIG. 3.

Figure 5:
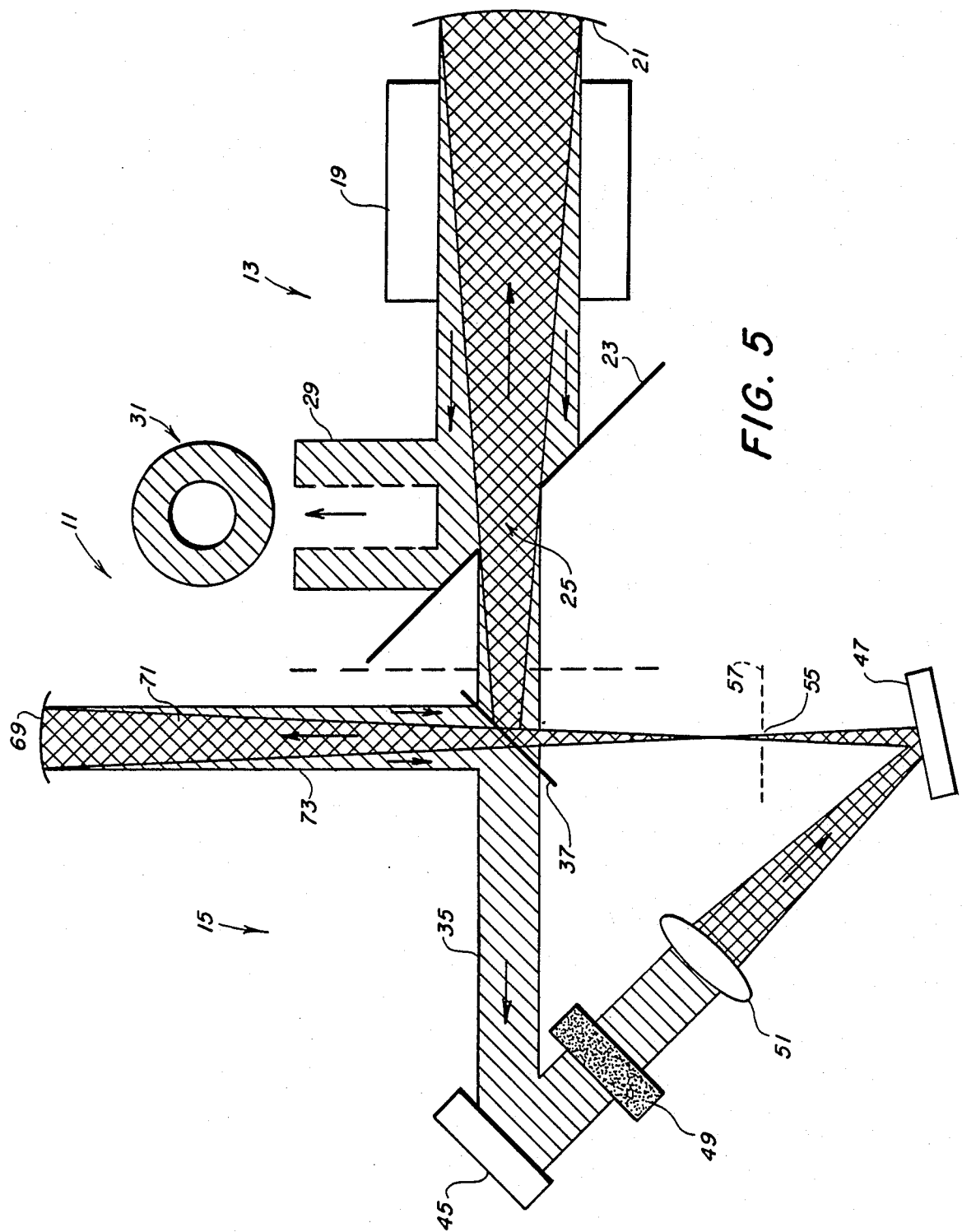
FIG. 5 is a schematic diagram of a fifth embodiment of the invention.

FIG. 5 illustrates a fifth embodiment of the invention and is a modification of the embodiment of FIG. 1. The operation of the embodiment of FIG. 5 is similar to that of the embodiment of FIG. 1. The only difference is in the additional use of a curved mirror 69 in the cavity of the unstable laser resonator 11 of FIG. 5 to reflect light that is lost at the beam splitter 37 back into the feedback ring 15.

In the embodiment of FIG. 1, on each pass through the feedback ring 15, half of the light available to be coupled back to the output section 13 at beam splitter 37 passes through the beam splitter 37 and is lost. In the embodiment of FIG. 5 this light 71 passes through the beam splitter 37, but is collimated by the curved mirror 69 and reflected back to the ring 15 as collimated beam 73. Half of the collimated beam 73 is reflected from the beam splitter 37 and becomes part of the collimated beam 35. The other half of the collimated beam 73 passes downward through the beam splitter 37 and becomes part of the undesired clockwise-propagating beam.

If the aperture 55 of plate 57 is not used at the focal point of the lens 51 in this embodiment, eventually substantially all of the light entering the feedback ring 15 will be returned to the output section 13 of the resonator 11. On the other hand, if the aperture 55 of the plate 57 is positioned at the focal point of the lens 51, some of the collimated beam 73 that is returned to the undesired clockwise-propagating beam in the ring 15 will be lost, but the amount of light that is fed from the ring 15 back into the output section 13 will be higher than it is in the embodiment of FIG. 1.

Figure 6A:
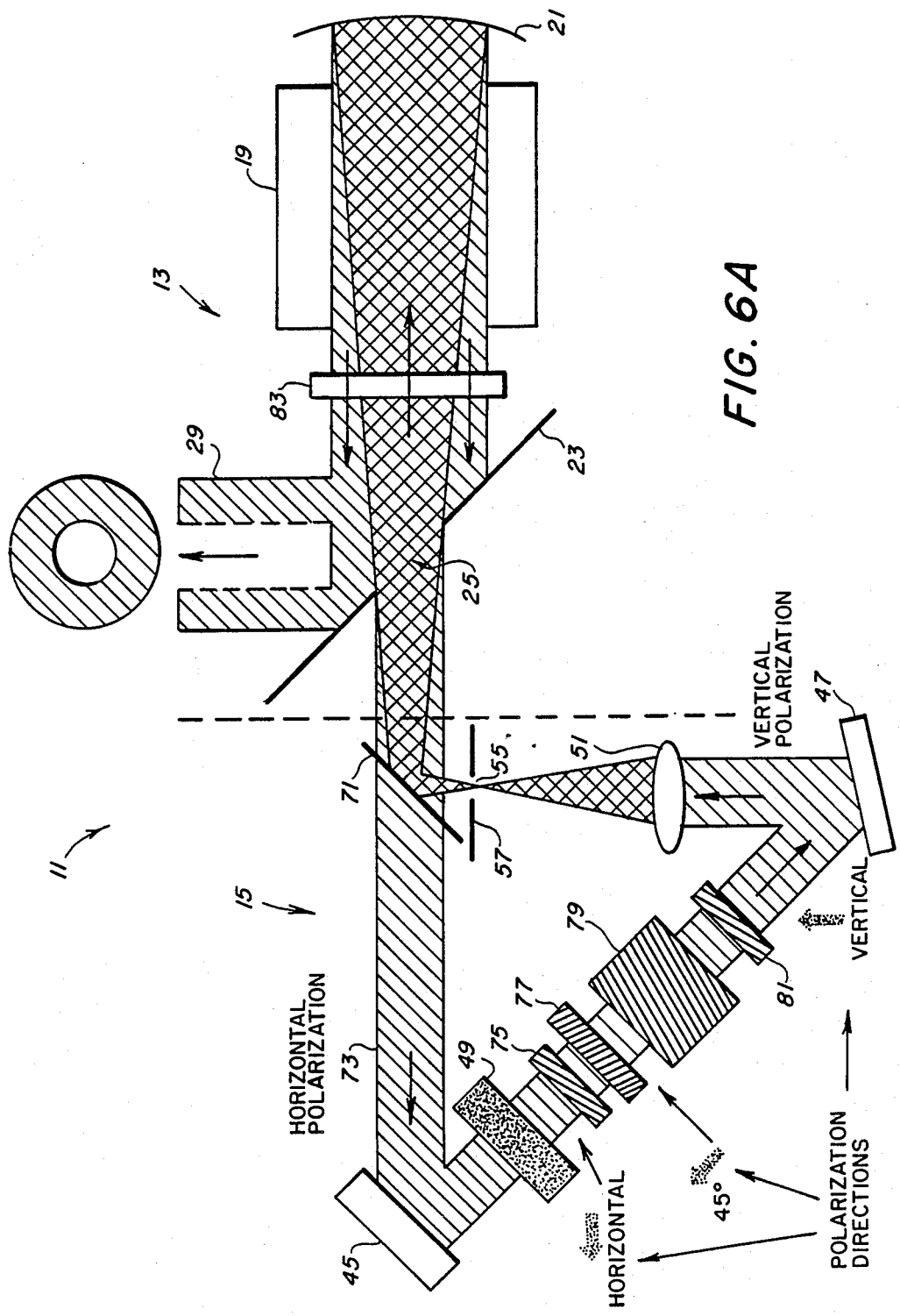

FIGS. 6A and 6B illustrate different operations in a schematic diagram of a sixth embodiment of the invention. More specifically, FIGS. 6A and 6B show the use of a Faraday rotator and polarizing optics to suppress the undesired clockwise-propagating beam in the feedback ring 15. FIG. 6A deals with the desired counterclockwise-propagating beam in the ring 15, while FIG. 6B deals with the undesired clockwise-propagating beam in the ring 15.

The embodiment of FIG. 6A, and its operation, can best be understood by tracing the path of light as it makes a round trip in the cavity of the unstable laser resonator 11.

Horizontally polarized light from the output section 13 is coupled into the feedback ring 15 through a horizontal polarizing beam splitter 71 to form the desired counterclockwise-propagating beam 73, which at this position in this embodiment is horizontally polarized. This beam 73 passes through the frequency narrowing element or Fabry-Perot etalon 49, a horizontal polarizer 75, and then through a 45° polarization rotator 77 which rotates the polarization of the beam 73 by 45°. The beam 73 at the output of the polarization rotator 77 is then passed through a Faraday rotator 79 which rotates its polarization by an additional 45°. As a result, the beam 73 at the output of the Faraday rotator 73 has a vertical polarization. The vertically polarized beam 73 is then passed through a vertical polarizer 81, reflected off of the corner mirror 47, focused by the lens 51 to the aperture 55, and reflected from the polarizing beam splitter 71 through the hole 25 in the scraper mirror 23 into the output section 13. On its first pass through the output section 13 this beam passes through a quarter wave plate 83, which changes the polarization of the beam from vertical to circular. After this circularly polarized beam is reflected from the output mirror 21, the beam is collimated and passes through the quarter wave plate 83. This quarter wave plate 83 then changes the polarization of this reflected beam from circular to horizontal. This horizontally polarized beam at the output of the quarter wave plate 83 will then pass again through the polarizing beam splitter 71 to form the desired counterclockwise-propagating beam in the feedback ring 15 on the next pass.

The suppression of the undesired clockwise-propagating beam in the ring with the Faraday rotator 79 will be explained by now referring to FIG. 6B. The operation of FIG. 6B can best be understood by tracing the path of that undesired clockwise-propagating beam in the feedback ring 15.

Light from the output section 13 is directed to the polarizing beam splitter 71. Half of that light passes through this beam splitter 71 to form the desired counterclockwise-propagating beam in the feedback ring 15, as discussed above. However, half of this light from the output section 13 is reflected from the polarizing beam splitter 71 as a vertically polarized light beam 85. The center portion of this reflected vertically polarized light beam 85 passes through the aperture 55 of plate 57 into the feedback ring 15 and forms the undesired clockwise-propagating beam 87 in the ring 15. This beam 87 is then focused by lens 51, reflected from corner mirror 47 and then passed through vertical polarizer 81. The beam 87 then passes through the Faraday rotator 79 which rotates the polarization of the beam 87 by 45°, and then through the 45° polarization rotator 77 which rotates the polarization of the beam 87 by 45° in the opposite direction. Therefore, beam 87 has a vertical polarization at the output of the polarization rotator 77. As a result of this vertical polarization, the undesired clockwise-propagating beam 87 is blocked from passing through the horizontal polarizer 75.

FIG. 7 illustrates a seventh embodiment of the invention and modifies the embodiment of FIGS. 6A and 6B of omitting the plate 57 and aperture 55.

The embodiment of FIG. 7 operates in the same manner as the sixth embodiment of FIG. 6B does to suppress the unwanted clockwise-propagating beam 87. However, in the embodiment of FIG. 7, the entire reflected vertically polarized light beam 85 forms the undesired clockwise-propagating beam in the ring 15 since there is no aperture 55 in FIG. 7. Similarly, the embodiment of FIG. 7 operates in the same manner as the sixth embodiment does to pass the desired counterclockwise-propagating beam, even without the aperture 55 of FIG. 6A, since the lens 51 will still focus at the same location in the ring 15 in relation to the desired counterclockwise-propagating beam in the ring.

Figure 8:
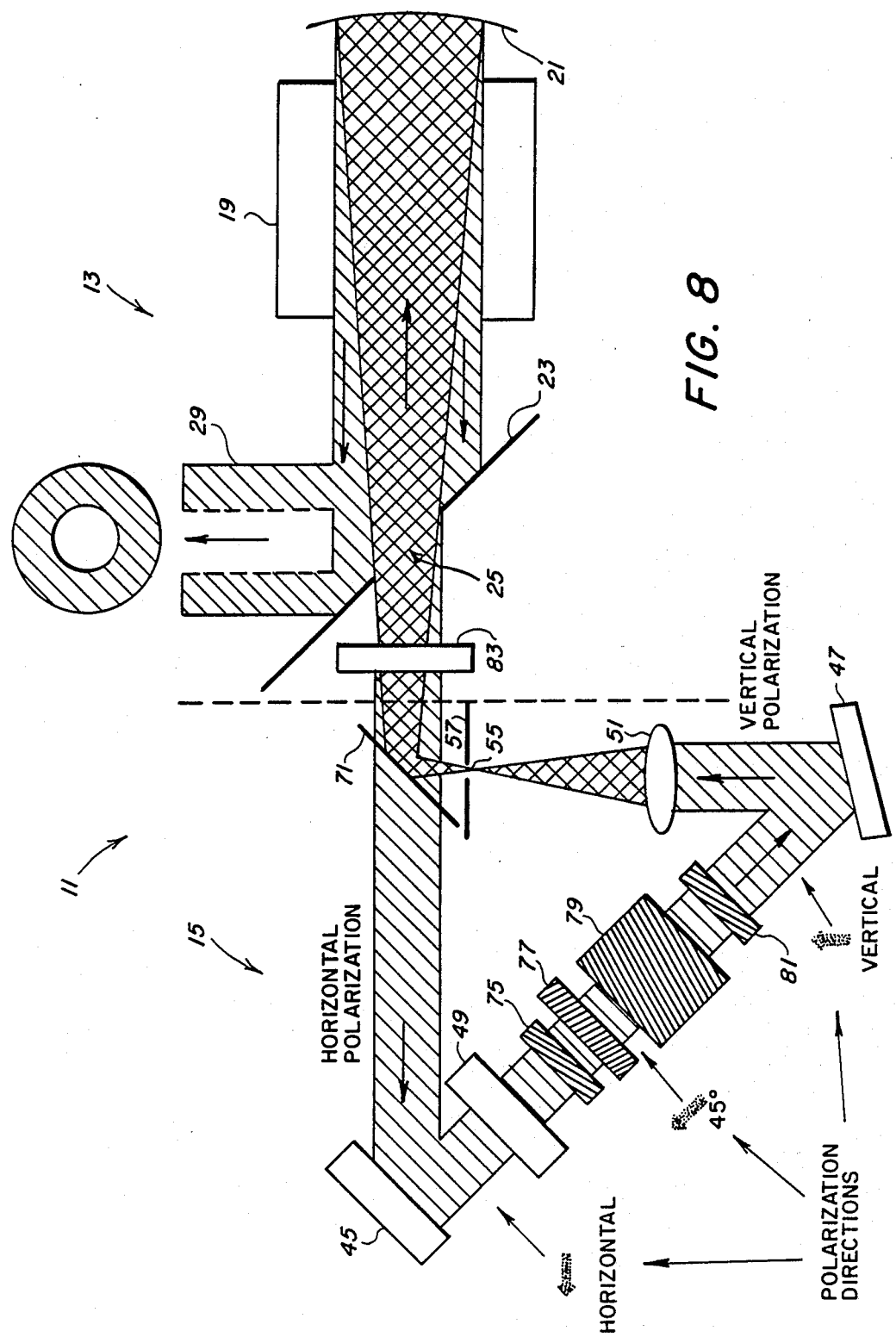
FIG. 8 is a schematic diagram of an eighth embodiment of the invention.

FIG. 8 illustrates an eighth embodiment of the invention and modifies the embodiment of FIG. 6A by moving the quarter wave plate 83 to the ring 15 side of the scraper mirror 23. By doing so, the circularly polarized beam that is collimated and reflected by the output mirror 21 is not changed to a horizontally polarized beam by the quarter wave plate 83 until after it propagates through the scraper mirror 23. As a result, the output beam 29 of FIG. 8 has a circular polarization, not the horizontal polarization of FIG. 6A. In some applications such a circularly polarized output beam is desired.

Figure 9:
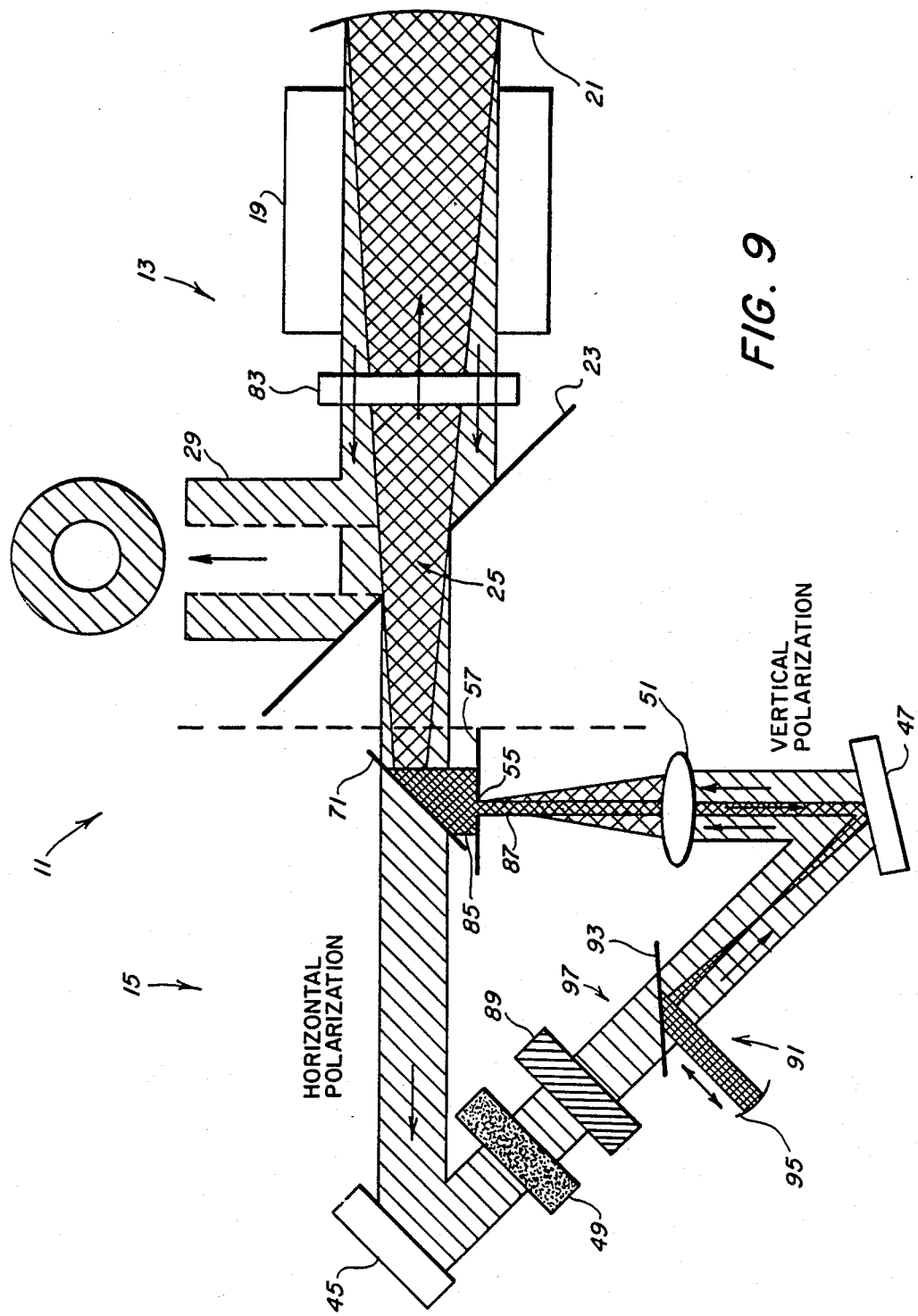
FIG. 9 is a schematic diagram of a ninth embodiment of the invention.

FIG. 9 illustrates a ninth embodiment of the invention and is a modification of the sixth embodiment of FIGS. 6A and 6B. In FIG. 9, a 90° polarization plate 89 and a reverse wave suppressing assembly 91, comprised of a 50% beam splitter 93 and a curved mirror 95, are substituted for the elements 75, 77, 79 and 81 in FIG. 6A and inserted in the leg 97 between corner mirrors 45 and 47 in order to suppress the undesired clockwise-propagating beam in the ring 15.

The desired counterclockwise-propagating beam has a horizontal polarization when it is coupled from the output section 13 into the feedback ring 15 through the polarizing beam splitter 71. This desired beam reflects from corner mirror 45 and passes through frequency narrowing Fabry-Perot etalon 49, 90° polarization plate 89, beam splitter 93, and then on through the rest of the ring 15 and the output section 13 as previously described in FIG. 6A.

Half of the horizontally polarized light from the output section 13 is reflected from the polarizing beam splitter 71 as the vertically polarized beam 85 (as shown in FIG. 6B). The center portion of this reflected beam 85 passes through the aperture 55 of plate 57 into the feedback ring 15 and forms the undesired clockwise-propagating beam 87. This beam 87 is then focused by lens 51 and reflected from corner mirror 47. Half of this beam 87 passes through the beam splitter 93 as the remaining portion of the clockwise-propagating beam in the ring 15. The other half of the beam 87 is reflected from the beam splitter 93 and is collimated by the curved mirror 95. Half of the beam reflected from the mirror 95 reflects from the beam splitter 93 and reinforces the desired counterclockwise-propagated beam. The remaining half of the beam reflected from the mirror 95 passes through the 50% beam splitter 93 and is lost to the cavity of the unstable laser resonator.

Therefore, what has been described is a system which uses a feedback ring in an unstable laser resonator to provide optical radiation which simultaneously has high output power, diffraction-limited divergence and narrow bandwidth.

It should therefore readily be understood that many modifications and variations of the present invention are possible within the purview of the claimed invention. It is therefore to be understood that, within the scope of the appended claims, the invention may be practiced otherwise than as specifically described.

What is claimed:

1. A narrow-bandwidth, unstable laser resonator comprising:
   an output section including:
      a laser gain medium for generating and amplifying light;
      a first reflective element for reflecting and collimating light from said gain medium back through said gain medium; and
      a second reflective element having a hole therein, said second reflective element being responsive to said collimated light passed through said gain medium for reflecting most of said collimated light out of said unstable laser resonator as an output beam and for passing the remaining portion of said collimated light through said hole therein as a residual beam; and
   a feedback ring including:
      an optical path;
      a beam splitter for passing a first portion of said residual beam into said optical path in a first direction;
      a frequency-narrowing element disposed at a position in said optical path where said first portion of said residual beam is collimated, said frequency-narrowing element being operative to narrow the frequency bandwidth of said first portion of said residual beam to a desired value to produce a narrow-bandwidth collimated beam;
      a lens disposed in said optical path for focusing said narrow-bandwidth collimated beam to cause light from said beam to be reflected from said beam splitter and passed through said hole in said second reflective element as a narrow-bandwidth divergent beam before said narrow-bandwidth divergent beam is amplified by said gain medium.

2. The narrow-bandwidth unstable laser resonator of claim 1 wherein:
   said first and second reflective elements are mirrors; and said frequency-narrowing element includes at least one Fabry-Perot etalon.

3. The narrow-bandwidth unstable laser resonator of claim 1 further including:
   a plurality of mirrors selectively positioned along said optical path, said plurality of mirrors cooperating with said beam splitter to reflect light along said optical path in said feedback ring.

4. The narrow-bandwidth unstable laser resonator of claim 3 further including:
   an aperture positioned at the focal point of said lens to pass said narrow-bandwidth convergent beam in said first direction and to substantially suppress any undesired light propagating in a second direction.

5. The narrow-bandwidth unstable laser resonator of claim 4 wherein:
   said lens is a positive lens for causing said narrow-bandwidth collimated beam to start diverging at said aperture.

6. The narrow-bandwidth unstable laser resonator of claim 1 further including:
   a diffraction grating; and
   a plurality of mirrors, said diffraction grating and said plurality of mirrors cooperating with said beam splitter to direct light along said optical path in said feedback ring.

7. The narrow-bandwidth unstable laser resonator of claim 6 further comprising:
   an aperture positioned at the focal point of said lens to pass said narrow-bandwidth convergent beam in said first direction and to substantially suppress any undesired light propagating in a second direction.

8. The narrow-bandwidth unstable laser resonator of claim 1 wherein:
   said lens is a negative lens for diverging said narrow-bandwidth collimated beam.

9. The narrow-bandwidth unstable laser resonator of claim 8 wherein:
   said first reflective element is a curved mirror;
   said second reflective element is a scraper mirror; and
   said frequency narrowing element includes at least one Fabry-Perot etalon.

10. The narrow-bandwidth unstable laser resonator of claim 8 further including:
    a plurality of mirrors selectively positioned along said optical path, said plurality of mirrors cooperating with said beam splitter to reflect light along said optical path in said feedback ring.

11. The narrow-bandwidth unstable laser resonator of claim 1 wherein a portion of said light focused by said lens passes through said beam splitter, said resonator further including:
    a curved mirror disposed adjacent to said beam splitter for causing part of said portion of light passed through said beam splitter to be reflected from said beam splitter back into said optical path in said first direction.

12. The narrow-bandwidth unstable laser resonator of claim 1 further including:
    first means located in said optical path at a position behind said frequency-narrowing element for passing said narrow-bandwidth collimated beam propagating in said first direction and for suppressing light propagating in a second direction in said feedback ring.

13. The narrow-bandwidth unstable laser resonator of claim 1 further including:
    first means disposed in said output section for changing the polarization of the beam from said feedback ring from a first polarization to a second polarization and for changing the polarization of the beam passed through said gain medium from said second polarization to a third polarization;
    second means disposed in said optical path behind said frequency narrowing element for passing any beam with said third polarization and suppressing any beam with a first polarization;
    third means disposed in said optical path behind said second means for rotating the polarization of a beam with a third polarization to a first polarization for a beam propagating in said first direction and for not rotating the polarization of a beam with a first polarization to a third polarization for a beam propagating in the second direction; and
    fourth means disposed in said optical path behind said third means for passing any beam with said first polarization and for suppressing any beam with a third polarization.

14. The narrow-bandwidth unstable laser resonator of claim 13 further including:
    an aperture positioned at the focal point of said lens to pass said narrow-bandwidth convergent beam in said first direction and to substantially suppress any undesired light propagating in a second direction.

* * * * *